United States Patent
Zhao et al.

(10) Patent No.: US 10,266,753 B1
(45) Date of Patent: Apr. 23, 2019

(54) MODIFIED NANO-GRAPHITE PARTICLE THREE-PHASE FOAM PROFILE CONTROL AND FLOODING SYSTEM AND PREPARATION METHOD THEREOF

(71) Applicant: CHINA UNIVERSITY OF PETROLEUM (EAST CHINA), Shandong (CN)

(72) Inventors: Guang Zhao, Qingdao Shandong (CN); Caili Dai, Qingdao Shandong (CN); Chenglin Gu, Qingdao Shandong (CN); Yuyang Li, Qingdao Shandong (CN); Yahui Lv, Qingdao Shandong (CN); Qing You, Qingdao Shandong (CN); Yongpeng Sun, Qingdao Shandong (CN); Mingwei Zhao, Qingdao Shandong (CN); Yining Wu, Qingdao Shandong (CN)

(73) Assignee: CHINA UNIVERSITY OF PETROLEUM (EAST CHINA) (CN)

( * ) Notice: Subject to any disclaimer, the term of this patent is extended or adjusted under 35 U.S.C. 154(b) by 0 days.

(21) Appl. No.: 16/040,307

(22) Filed: Jul. 19, 2018

(30) Foreign Application Priority Data

Oct. 19, 2017 (CN) .......................... 2017 1 0980124

(51) Int. Cl.
| | |
|---|---|
| *C09K 8/94* | (2006.01) |
| *E21B 43/20* | (2006.01) |
| *C09K 8/594* | (2006.01) |
| *E21B 43/16* | (2006.01) |

(52) U.S. Cl.
CPC ................ *C09K 8/594* (2013.01); *C09K 8/94* (2013.01); *E21B 43/164* (2013.01); *E21B 43/168* (2013.01); *E21B 43/20* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 2013/0175026 A1* | 7/2013 | Chakraborty | C08J 9/0071 166/228 |
| 2018/0238160 A1* | 8/2018 | Nguyen | C09K 8/80 |

\* cited by examiner

*Primary Examiner* — John J Figueroa
(74) *Attorney, Agent, or Firm* — Calfee, Halter & Griswold LLP

(57) ABSTRACT

The present invention provides a modified nano-graphite particle three-phase foam profile control and flooding system, which comprises a liquid phase and a gas phase, wherein the liquid phase comprises 0.15%-0.35% foaming agent, 0.04-0.1% foam stabilizer, and water that accounts for the remaining content, the sum of weight percentages of above components is 100%; a gas-liquid ratio of the gas phase to the liquid phase is (1-3):1. The foaming agent is selected from one of alkylsulfopropyl betaine and alkylamidopropyl betaine or a combination of them. The foam stabilizer is modified nano-graphite particles in 80-150 nm particle diameter. The present invention further provides a preparation method of the modified nano-graphite particle and a preparation method of the three-phase foam profile control and flooding system. The nano-graphite particle three-phase foam profile control and flooding system provided in the present invention can greatly improve the stability of generated foams, has excellent fluidity control capability, is low in cost, simple to prepare, and convenient for large-scale field construction.

6 Claims, 3 Drawing Sheets

MODIFIED NANO-GRAPHITE PARTICLE THREE-PHASE FOAM PROFILE CONTROL AND FLOODING SYSTEM AND PREPARATION METHOD THEREOF

CROSS-REFERENCE TO RELATED APPLICATIONS

The present application claims priority to Chinese Patent Application No. 201710980124.4, filed on Oct. 19, 2017, and the entire contents thereof are incorporated herein by reference.

FIELD OF THE INVENTION

The present invention belongs to the field of oil field chemistry, and particularly relates to a modified nano-graphite particle three-phase foam profile control and flooding system for in depth profile control and flooding in oil field and preparation method of the modified nano-graphite particle three-phase foam profile control and flooding system.

BACKGROUND OF THE INVENTION

Long-term water-flooding extraction in oil fields results in aggravated non-homogeneity of the strata, accelerated water-cut rising speed and degraded water flooding efficiency or inefficient circulation in the middle and late stages of oil field exploitation. Consequently, a great deal of remaining oil in the strata can't be exploited. Therefore, decreasing the water-cut in the oil wells is the key to increasing and stabilizing the yield in the oil fields in in depth exploration of remaining oil in high water-cut oil reservoirs in the middle and late stages. In recent years, foam materials have been widely applied in oil fields and mine sites, owing to their advantages including high apparent viscosity, reduction ability of oil-water interfacial tension, and high selectivity (defoamed in oil and stabilized in water), etc. Foam profile control and flooding systems commonly used in oil fields mainly include single liquid phase foam system, polymer enhanced foam system, gel enhanced foam system, and nano-particle enhanced foam system. A single liquid phase foam system consists of surfactant and gas ($N_2$, $CO_2$), but has poor stability and is usually applicable to medium-low temperature and medium-low salt content oil reservoirs. For a polymer enhanced foam system, a polymer is added in foaming solution, and thereby the thickness of the liquid films is increased and the drainage speed of the liquid films is decreased by virtue of the viscosity of the polymer, and the stability of the foams is improved. However, owing to be influenced by the injection equipment, shearing stress in pores of the strata, and physical and chemical properties of the strata, the viscosity loss of the polymer is severe, and the foam stability of the polymer is limited. Therefore, a polymer enhanced foam system is especially not suitable for use in medium-high temperature and medium-high salt content oil reservoirs. Gel enhanced foams are formed by polymer, cross-linking agent, foaming agent and gas ($N_2$, $CO_2$), and a gel enhanced foam system utilizes the strong viscoelastic effect of gel to improve the viscosity of the external phase and increase the thickness of the liquid films to realize foam stability and long-time effectiveness, and is usually applicable to medium-high temperature and medium-high salt content oil reservoirs. However, the polymer in the gel is also subjected to the influence of the injection equipment, shearing stress in the pores of the strata, and physical and chemical properties of the strata, and consequently the gelation time and gel strength of the gel are difficult to control and the foam stabilization capability is limited. The nano-particle enhanced foam system developed recently utilizes the adsorption effect of the particles to enhance foam stability, but the foam stabilizing particles are mainly modified nano-silica particles, and the surface properties of the nano-particles may vary under the influence of physical and chemical properties of the strata and long-time erosion of stratum water. Therefore, the foam stabilization effect is poor. Besides, nano-silica particles have high density and may produce a gravitational differentiation effect. Consequently, the foam stabilization effect of the particles is limited.

Contents of the Invention

To overcome the drawbacks in the foam profile control and flooding systems in the prior art, the present invention provides a modified nano-graphite particle three-phase foam profile control and flooding system for in depth profile control and flooding for oil reservoir with high water content in the middle and late stages and a preparation method of the modified nano-graphite particle three-phase foam profile control and flooding system. Utilizing the adsorption characteristic of modified nano-graphite particles, to improves the stability of the foams by improving the strength of the liquid films and decreasing the drainage speed of the liquid films, and thereby exerts the regulation and control capability for high-permeability strata as far as possible; in addition, utilizing the oil displacement capability of the foaming agent solution, the modified nano-graphite particle and the foaming agent attains a synergistic effect and greatly improves the oil recovery rate.

To attain the object described above, the present invention employs the following technical scheme:

a modified nano-graphite particle three-phase foam profile control and flooding system, comprising a liquid phase and a gas phase, wherein the liquid phase comprises a foaming agent, a foam stabilizer, and water; based on the total mass of the liquid phase, the weight percentages of the foaming agent is 0.15%-0.35%, the weight percentages of the foam stabilizer is 0.04-0.1%, the water accounts for the remaining content in the liquid phase, and the sum of the weight percentages of the components is 100%; a gas-liquid ratio of the gas phase to the liquid phase is controlled at (1-3):1.

Furthermore, the foaming agent above is selected from one of alkylsulfopropyl betaine and alkylamidopropyl betaine or a combination of thereof.

Furthermore, the foam stabilizer above preferably is modified nano-graphite particles, which are preferably in 80-150 nm particle diameter.

Furthermore, the gas phase above preferably is one of nitrogen, carbon dioxide and natural gas.

Furthermore, the structural formula of the alkylsulfopropyl betaine above serving as the foaming agent is represented by the following formula (1):

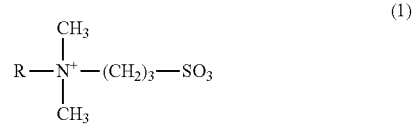

in the formula (1), R is $C_{12}$, $C_{14}$ or $C_{16}$ alkyl.

Furthermore, the structural formula of the alkylamidopropyl betaine above serving as the foaming agent is represented by the following formula (2):

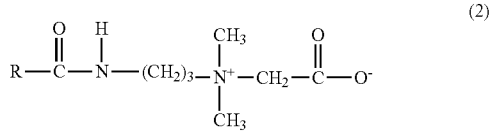

(2)

in the formula (2), R is $C_{10}$-$C_{16}$ alkyl.

Furthermore, the water in the modified nano-graphite particle three-phase foam profile control and flooding system is clean water or treated re-injected water in oil field.

The present invention further provides a method for preparing the modified nano-graphite particles, which comprises the following steps:

adding graphite particles in 15 μm particle diameter into deionized water and stirring for 10 min. to disperse the graphite particles at room temperature (20±5° C.), to prepare graphite dispersed solution; loading the graphite dispersed solution prepared into a colloid mill and shearing the graphite dispersed solution cyclically for 5-10 min. under a 40-45 Hz shearing condition, to prepare sheared graphite dispersed solution; dispersing the obtained sheared graphite dispersed solution by ultrasonic dispersion for 3-6 h, and taking the supernatant liquid, to obtain homogeneous graphite dispersed solution; adding sodium dodecyl sulfate into the obtained homogeneous graphite dispersed solution, and stirring at 40-50° C. temperature for 3-6 h, to obtain modified graphite particles in 80-150 nm particle diameter.

The present invention further provides a method for preparing the modified nano-graphite particle three-phase foam profile control and flooding system.

Adding modified graphite particles prepared with the method described above in the present invention into water, and stirring for 10 min. to disperse the modified graphite particles homogeneously at room temperature (20±5° C.); then adding one of alkylsulfopropyl betaine and alkylamidopropyl betaine or a combination of them as a foaming agent, and stirring for 5 min. to dissolve the foaming agent fully, wherein, the weight percentage of the modified in graphite particles in the liquid phase is 0.04%-0.1%, the weight percentage of the alkylsulfopropyl betaine or alkylamidopropyl betaine or the combination of them is 0.15%-0.35%; next, charging the gas at (1-3):1 gas-liquid ratio by a foaming device into the liquid phase, to obtain the modified nano-graphite particle three-phase foam profile control and flooding system.

Furthermore, the gas in the above preparation method preferably is one of nitrogen, carbon dioxide and natural gas.

Furthermore, the structure of the alkylsulfopropyl betaine serving as the foaming agent is represented by the following formula (1):

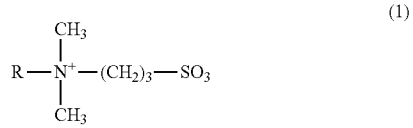

(1)

in the formula (1), R is $C_{12}$, $C_{14}$ or $C_{16}$ alkyl.

Furthermore, the structure of the alkylamidopropyl betaine serving as the foaming agent is represented by the following formula (2):

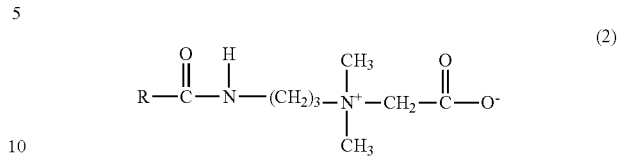

(2)

in the formula (2), R is $C_{10}$-$C_{16}$ alkyl.

Compared with the prior art, the present invention attains the following beneficial effects:

(1) The modified nano-graphite particles employed in the present invention works with one of alkylsulfopropyl betaine, alkylamidopropyl betaine or a combination of them to attain an excellent synergistic effect of foam generation and foam stabilization; after the modified nano-graphite particles are added, the strength of the liquid films of the foams is increased and the drainage speed of the liquid films of the foams is decreased, and thereby the stability of the generated foams is greatly improved.

The foam profile control and flooding system attains swept volume enlargement and oil displacement efficiency improvement effects before defoaming, and it enters into the in depth portion of the reservoir by virtue of the self-lubrication feature of the modified graphite particles after defoaming, and achieves effective regulation and control of high-permeability flow channels, so that the subsequent injection pressure is kept at a high level and thereby further in depth exploitation of remaining oil in oil reservoirs with high water content in the middle and late stages is improved.

(2) The modified nano-graphite particles employed in the present invention have temperature-resistant and salt-resistant characteristics, can be dispersed stably in a long time, and thereby improves the stability of the modified nano-graphite particle three-phase foams.

(3) The alkylsulfopropyl betaine or alkylamidopropyl betaine or the combination of them employed in the present invention has good temperature-resistant and salt-resistant performance, and improves the applicability range of the modified nano-graphite particle three-phase foams to oil reservoirs; besides, it has high interfacial activity, and can decrease the oil-water interfacial tension to $10^{-2}$ mN/m order of magnitude, enlarge the swept volume and improve the oil displacement efficiency as well.

(4) On one hand, the modified nano-graphite particles employed in the present invention has high foam stabilization performance; on the other hand, the modified nano-graphite particles still achieve effective plugging of high-permeability flow channels by direct plugging or bridged plugging by virtue of the plugging characteristic of the particles after the foams disappear, have high fluidity control capability, and can remarkably improve the swept volume of the follow-up fluid.

(5) The modified nano-graphite particle three-phase foam profile control and flooding system in the present invention is simple to prepare, the required foaming agent and gas are widely available and low in price, and the modified nano-graphite particles are simple to prepare and convenient for large-scale field construction.

DETAILED DESCRIPTION OF THE EMBODIMENTS

Figure 1:
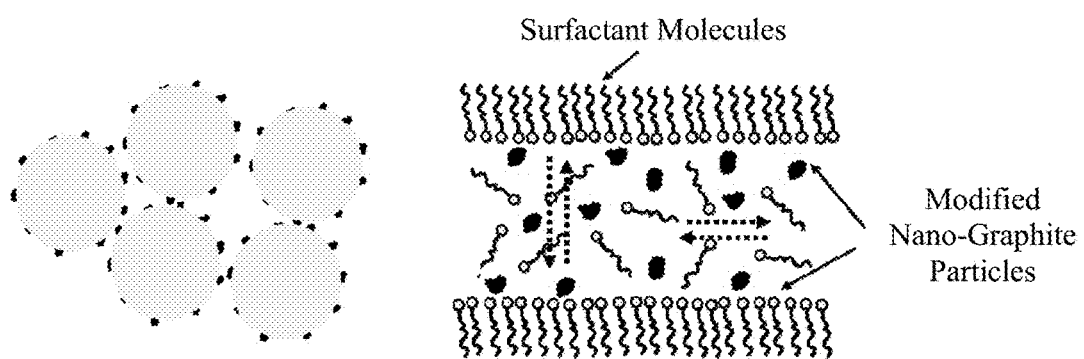
FIG. 1 is a schematic diagram of the foam stabilization mechanism of the modified nano-graphite particle three-phase foam profile control and flooding system.
Figure 2:
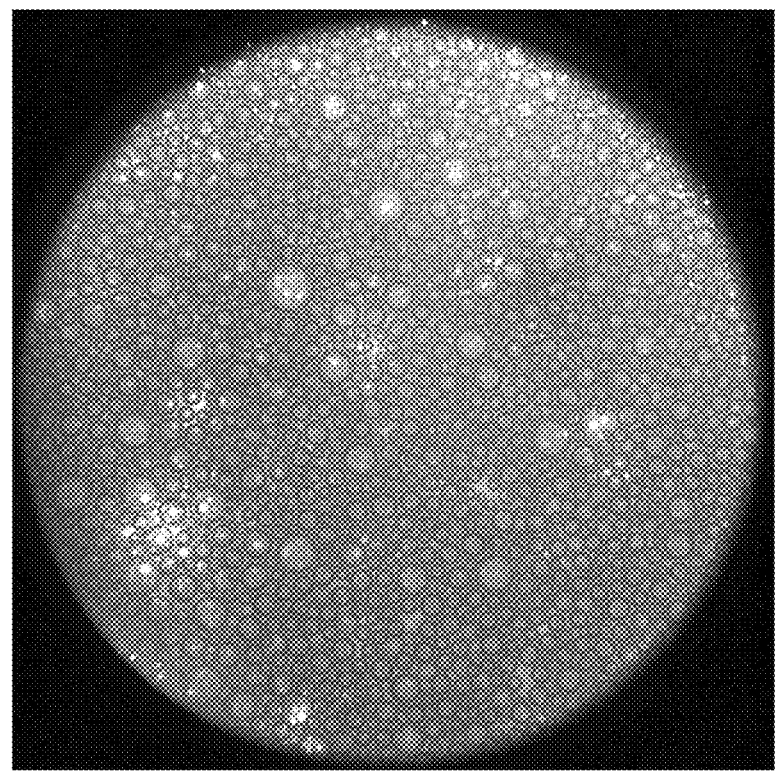
FIG. 2 shows the microstructure of the modified nano-graphite particle three-phase foam profile control and flooding system in example 1 amplified by 50 times.
Figure 3:
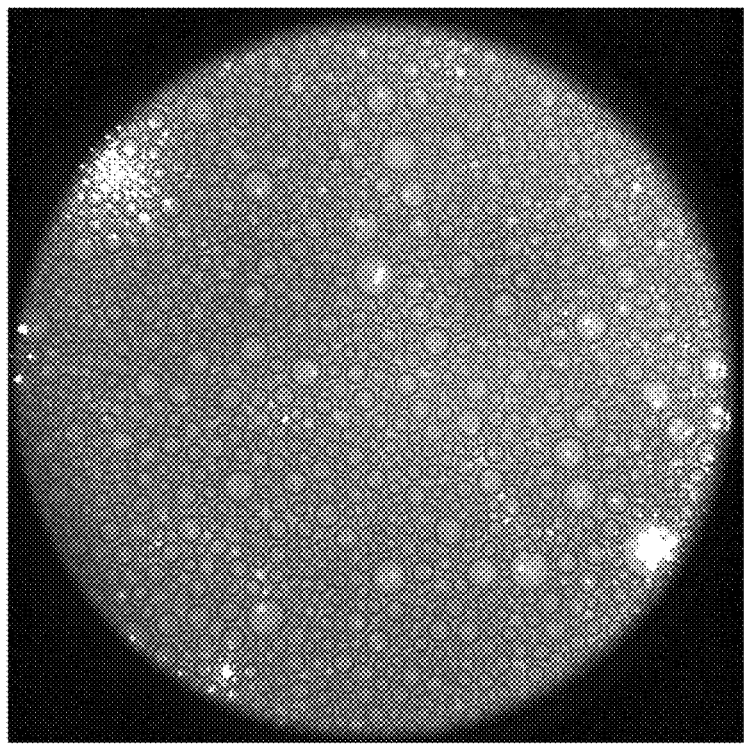
FIG. 3 shows the microstructure of the modified nano-graphite particle three-phase foam profile control and flooding system in example 2 amplified by 50 times.
Figure 4:
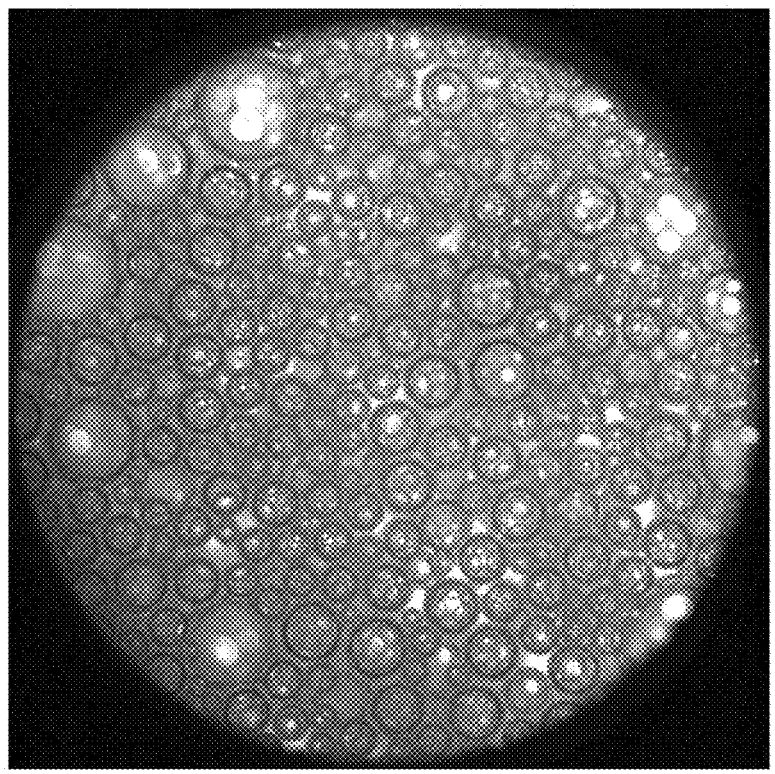
FIG. 4 shows the microstructure of the modified nano-graphite particle three-phase foam profile control and flooding system in example 3 amplified by 100 times.
Figure 5:
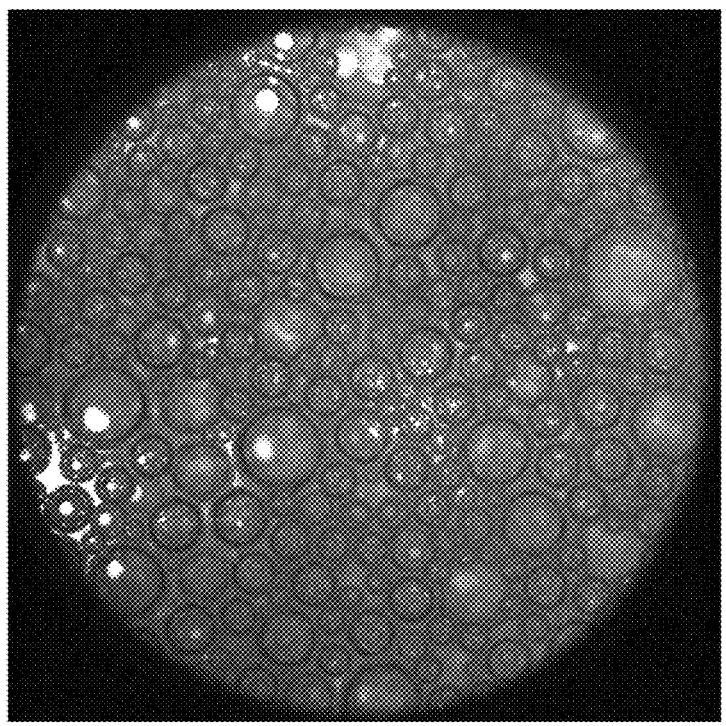
FIG. 5 shows the microstructure of the modified nano-graphite particle three-phase foam profile control and flooding system in example 4 amplified by 100 times.

To assist those skilled in the art to understand the present invention better, hereunder the present invention will be further detailed in embodiments with reference to the accompanying drawings.

Example 1

The modified nano-graphite particle three-phase foam profile control and flooding system comprises: alkylsulfopropyl betaine foaming agent accounting for 0.2% weight percentage; modified nano-graphite particles accounting for 0.1% weight percentage; and water accounting for the remaining weight percentage (99.7%); the sum of the weight percentages of the components is 100%.

The modified nano-graphite particles are prepared with the following method: 200 g graphite particles in 15 μm particle diameter are added into 800 g deionized water at room temperature (20±5° C.), and the mixture is stirred for 10 min. to fully disperse the graphite particles, so that graphite dispersed solution is obtained; the obtained graphite dispersed solution is loaded into a colloid mill and sheared cyclically for 10 min. under a 45 Hz shearing condition, so that sheared graphite dispersed solution is obtained; the obtained sheared graphite dispersed solution is dispersed by ultrasonic for 6 h, and the supernatant liquid is taken, so that 400 g homogeneously dispersed solution at 5% weight percentage is obtained; 20 g sodium dodecyl sulfate is added into the obtained homogeneously dispersed solution, and the mixture is stirred at 40° C. for 6 h, so that modified graphite particles in 80 nm particle diameter are obtained.

The modified nano-graphite particle three-phase foam profile control and flooding system is prepared with the following method: 0.04 g alkylsulfopropyl betaine foaming agent and 0.02 g modified graphite particles are added into 19.92 g water successively at room temperature (20±5° C.) while stirring, then the mixture is further stirred for 5 min. to obtain a homogeneous liquid phase of the modified nano-graphite particle three-phase foam system. Nitrogen is charged at 3:1 gas-liquid ratio with Ross-Mile method at 80° C.; the measured foaming volume of the modified nano-graphite particle three-phase foam profile control and flooding system is 220 mL, the measured half-life is 330 s, and the oil-water interfacial tension is decreased to $7.6 \times 10^{-2}$ mN/m.

Example 2

The modified nano-graphite particle three-phase foam profile control and flooding system comprises: alkylsulfopropyl betaine foaming agent accounting for 0.35% weight percentage; modified nano-graphite particles accounting for 0.06% weight percentage; and water accounting for the remaining weight percentage (99.69%); the sum of the weight percentages of the components is 100%.

The modified nano-graphite particles are prepared with the following method: 200 g graphite particles in 15 μm particle diameter are added into 800 g deionized water at room temperature (20±5° C.), and the mixture is stirred for 10 min. to fully disperse the graphite particles, so that graphite dispersed solution is obtained; the obtained graphite dispersed solution is loaded into a colloid mill and sheared cyclically for 5 min. under a 40 Hz shearing condition, so that sheared graphite dispersed solution is obtained; the obtained sheared graphite dispersed solution is dispersed by ultrasonic for 4 h, and the supernatant liquid is taken, so that 400 g homogeneously dispersed solution at 4% weight percentage is obtained; 16 g sodium dodecyl sulfate is added into the obtained homogeneously dispersed solution, and the mixture is stirred at 40° C. for 4 h, so that modified graphite particles in 120 nm particle diameter are obtained.

The modified nano-graphite particle three-phase foam profile control and flooding system is prepared with the following method: 0.07 g alkylsulfopropyl betaine foaming agent and 0.012 g modified graphite particles are added into 19.918 g successively water at room temperature (20±5° C.) while stirring, then the mixture is further stirred for 5 min. to obtain a homogeneous liquid phase of the modified nano-graphite particle three-phase foam system. Nitrogen is charged at 2:1 gas-liquid ratio with Ross-Mile method at 80° C.; the measured foaming volume of the modified nano-graphite particle three-phase foam profile control and flooding system is 240 mL, the measured half-life is 350 s, and the oil-water interfacial tension is decreased to $4.6 \times 10^{-2}$ mN/m.

Example 3

The modified nano-graphite particle three-phase foam profile control and flooding system comprises: alkylsulfopropyl betaine foaming agent accounting for 0.15% weight percentage and alkylamidopropyl betaine foaming agent accounting for 0.2% weight percentage; modified nano-graphite particles accounting for 0.08% weight percentage; and water accounting for the remaining weight percentage (99.62%); the sum of the weight percentages of the components is 100%.

The modified nano-graphite particles are prepared with the following method: 200 g graphite particles in 15 μm particle diameter are added into 800 g deionized water at room temperature (20±5° C.), and the mixture is stirred for 10 min. to fully disperse the graphite particles, so that graphite dispersed solution is obtained; the obtained graphite dispersed solution is loaded into a colloid mill and sheared cyclically for 5 min. under a 45 Hz shearing condition, so that sheared graphite dispersed solution is obtained; the obtained sheared graphite dispersed solution is dispersed by ultrasonic for 5 h, and the supernatant liquid is taken, so that 400 g homogeneously dispersed solution at 4.5% weight percentage is obtained; 18 g sodium dodecyl sulfate is added into the obtained homogeneously dispersed solution, and the mixture is stirred at 30° C. for 6 h, so that modified graphite particles in 100 nm particle diameter are obtained.

The modified nano-graphite particle three-phase foam profile control and flooding system is prepared with the following method: 0.03 g alkylsulfopropyl betaine foaming agent, 0.04 g alkylamidopropyl betaine foaming agent, and 0.016 g modified graphite particles are added into 19.914 g water successively at room temperature (20±5° C.) while stirring, then the mixture is further stirred for 5 min. to obtain a homogeneous liquid phase of the modified nano-graphite particle three-phase foam system. Nitrogen is charged at 3:1 gas-liquid ratio with Ross-Mile method at 80° C.; the measured foaming volume of the modified nano-graphite particle three-phase foam profile control and flooding system is 260 mL, the measured half-life is 365 s, and the oil-water interfacial tension is decreased to $3.2 \times 10^{-2}$ mN/m.

Example 4

The modified nano-graphite particle three-phase foam profile control and flooding system comprises: alkylsulfopropyl betaine foaming agent accounting for 0.1% weight percentage and alkylamidopropyl betaine foaming agent accounting for 0.15% weight percentage; modified nano-graphite particles accounting for 0.1% weight percentage; and water accounting for the remaining weight percentage (99.65%); the sum of the weight percentages of the components is 100%.

The modified nano-graphite particles are prepared with the following method: 200 g graphite particles in 15 μm particle diameter are added into 800 g deionized water at room temperature (20±5° C.), and the mixture is stirred for 10 min. to fully disperse the graphite particles, so that graphite dispersed solution is obtained; the obtained graphite dispersed solution is loaded into a colloid mill and sheared cyclically for 10 min. under a 45 Hz shearing condition, so that sheared graphite dispersed solution is obtained; the obtained sheared graphite dispersed solution is dispersed by ultrasonic for 6 h, and the supernatant liquid is taken, so that 400 g homogeneously dispersed solution at 5% weight percentage is obtained; 20 g sodium dodecyl sulfate is added into the obtained homogeneously dispersed solution, and the mixture is stirred at 30° C. for 6 h, so that modified graphite particles in 85 nm particle diameter are obtained.

The modified nano-graphite particle three-phase foam profile control and flooding system is prepared with the following method: 0.01 g alkylsulfopropyl betaine foaming agent, 0.03 g alkylamidopropyl betaine foaming agent, and 0.02 g modified graphite particles are added into 19.94 g water successively at room temperature (20±5° C.) while stirring, then the mixture is further stirred for 5 min. to obtain a homogeneous liquid phase of the modified nano-graphite particle three-phase foam system. Nitrogen is charged at 2:1 gas-liquid ratio with Ross-Mile method at 80° C.; the measured foaming volume of the modified nano-graphite particle three-phase foam profile control and flooding system is 240 mL, the measured half-life is 335 s, and the oil-water interfacial tension is decreased to $4.1 \times 10^{-2}$ mN/m.

While the present invention is described above in embodiments, the description is exemplary rather than exhaustive, and the present invention is not limited to the embodiments disclosed above. It is obvious to those having ordinary skills in the art that various modifications and alternations can be made without departing from the scope and spirit of the embodiments described above. Therefore, the protection scope of the present invention shall be deemed as the protection scope defined by the claims only.

The invention claimed is:

1. A method of preparing a composition for foam profile control and flooding, the composition comprising a liquid phase and a gas phase, wherein:
   the liquid phase comprises 0.15%-0.35% foaming agent, 0.04-0.1% foam stabilizer, and water; and
   a gas-liquid ratio of the gas phase to the liquid phase is (1-3):1;
   the method comprising the following steps:
      step 1: adding modified nano-graphite particles into water and stirring to disperse the nano-graphite particles, to obtain a graphite dispersed solution;
   wherein the modified nano-graphite particles are prepared with the following method:
      1) adding dispersed graphite particles having a 15 μm particle diameter into deionized water and stirring for 10 min, to disperse the dispersed graphite particles at room temperature, to prepare a first graphite dispersed solution;
      2) loading the first graphite dispersed solution into a colloid mill and shearing the first graphite dispersed solution cyclically for 5-10 min. under a 40-45 Hz shearing condition, to prepare a second graphite dispersed solution;
      3) dispersing the second graphite dispersed solution by ultrasonic dispersion for 3-6 h, and removing the supernatant liquid, to obtain a homogeneous graphite dispersed solution;
      4) adding sodium dodecyl sulfate, and stirring at 30-50° C. temperature for 3-6 h, to obtain the modified nano-graphite particles having a 80-150 nm particle diameter;
      step 2: adding a foaming agent, and stirring till the foaming agent is dissolved fully, to obtain a liquid phase;
      step 3: charging a gas at (1-3):1 gas-liquid ratio by a foaming device into the liquid phase, to obtain a modified nano-graphite particle three-phase foam profile control and flooding system.

2. The method according to claim 1, wherein the stirring time for dispersion in step 1 is 5-10 min.; and
   the foaming agent in step 2 is selected from one of alkylsulfopropyl betaine and alkylamidopropyl betaine or a combination thereof.

3. The method according to claim 2, wherein the foaming agent is an alkylsulfopropyl betaine and is represented by formula (1):

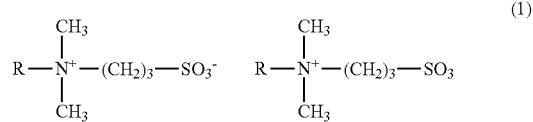

wherein R is $C_{12}$, $C_{14}$, or $C_{16}$ alkyl.

4. The method according to claim 2, wherein the foaming agent is an alkylamidopropyl betaine and is represented by formula (2):

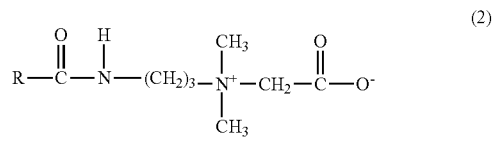

wherein R is $C_{10}$-$C_{16}$ alkyl.

5. The method according to claim 1, wherein the water in the liquid phase is clean water or treated re-injected water in oil field.

6. The method according to claim 1, wherein the gas phase is selected from nitrogen, carbon dioxide and natural gas.

* * * * *